UNITED STATES PATENT OFFICE 2,069,743

AZO DYESTUFFS AND THEIR PRODUCTION

Hans Krzikalla and Paul Garbsch, Ludwigshafen-on-the-Rhine, Germany, assignors to General Aniline Works, Inc., New York, N. Y., a corporation of Delaware No Drawing. Application September 21, 1935, Serial No. 41,626. In Germany October 18, 1934

7 Claims. (Cl. 260—96)

The present invention relates to new azo dyestuffs.

We have found that valuable new azo dyestuffs are obtained by coupling diphenylamines free from sulphonic and carboxylic acid groups and having the general formula:

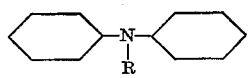

in which R stands for an aliphatic radicle having at least one free hydroxyl group with diazo compounds of aromatic amines free from sulphonic and carboxylic acid groups. The aliphatic radicle may be, for example, a hydroxyethyl, hydroxypropyl or dihydroxypropyl radicle. The two benzene nuclei of the diphenylamine may also contain alkyl, alkoxy, hydroxyalkyl, amino or alkylamino groups but one must have at least one position capable of coupling.

As diazo components may be mentioned especially the diazo compounds of amines of the benzene series containing halogen or nitro groups, as for example 1-amino-4-nitrobenzene, 1-amino-2,4-dinitrobenzene, 1-amino-2-chlor-4-nitrobenzene, 1-amino-2,4-dinitro-6-chlorbenzene, 1-amino-2,4-dinitro-6-brombenzene, 1-amino-2,6-dichlor-4-nitrobenzene or 1-hydroxy-2-amino-5-nitrobenzene.

The dyestuffs thus obtainable are especially suitable for dyeing cellulose esters and ethers. They are also suitable for coloring stearin and paraffin wax and for the preparation of spirit and cellulose ester varnishes.

The following examples will further illustrate how the said invention may be carried out in practice but the invention is not restricted to these examples. The parts are by weight.

Example 1

27.8 parts of 1-amino-4-nitrobenzene are diazotized and coupled with a solution of 43 parts of hydroxyethyldiphenylamine in 400 parts of glacial acetic acid while adding an aqueous solution of sodium acetate. The coupling is completed after a short time and a dyestuff is obtained which dyes acetate artificial silk deep orange shades of very good fastness to light. The dyestuff is also very suitable for coloring nitrocellulose lacquers.

When employing the N-dihydroxypropyldiphenylamine, obtainable by the action of epichlorhydrin on diphenylamine, a dyestuff having a similar shade of color and similar properties is obtained.

Example 2

172 parts of 1-amino-2-chlor-4-nitrobenzene are diazotized and coupled with an emulsion of 240 parts of N-hydroxyethyl-diphenylamine. The dyestuff obtained yields very fast red dyeings on acetate artificial silk, the dyeings being capable of being discharged white.

Example 3

94 parts of 1-amino-2,4-dinitrobenzene are diazotized and coupled with a solution of 120 parts of N-hydroxyethyl-diphenylamine in 1000 parts of glacial acetic acid. The resulting dyestuff dyes acetate artificial silk red-violet shades of very good fastness to washing.

Example 4

13.1 parts of 1-amino-2,4-dinitro-6-brombenzene are diazotized and added to a solution of 11.4 parts of N-hydroxy-ethyldiphenylamine in 100 parts of glacial acetic acid. The dyestuff thus obtainable yields a violet dyeing on acetate artificial silk. It is also soluble in cellulose ester lacquers.

Example 5

If 17.2 parts of 1-amino-2-nitro-4-chlorbenzene be diazotized and the diazo compound coupled with an emulsion of 23 parts of N-hydroxyethyldiphenylamine, a dyestuff is obtained which dyes acetate artificial silk orange shades.

Example 6

139 parts of 1-amino-4-nitrobenzene are diazotized and coupled with 242 parts of emulsified N-hydroxyethyl-4-methyldiphenylamine. The formation of the dyestuff is complete after 12 hours. A dyestuff is obtained which dyes acetate artificial silk red-orange shades.

Example 7

139 parts of 1-amino-4-nitrobenzene are diazotized, the diazo solution is allowed to run while cooling well into an emulsion of 255 parts of N-hydroxyethyl-3-methoxydiphenylamine and the mineral acid is partly neutralized with sodium acetate. A dyestuff is obtained which dyes acetate artificial silk red-orange shades.

Example 8

17.2 parts of 1-amino-2-chlor-4-nitrobenzene are diazotized and coupled with 25.5 parts of N-hydroxyethyl-3-methoxydiphenylamine in a strong alcoholic solution or in aqueous emulsion.

A dyestuff is obtained which is soluble in varnish lacquers with a red-violet coloration.

Example 9

13.9 parts of 1-amino-4-nitrobenzene are diazotized and the diazo compound is coupled with a solution of 30 parts of N-hydroxyethyl-3-dimethylamino - 4 - methyldiphenylamine in 400 parts of water and 12 parts of concentrated hydrochloric acid with an addition of sodium acetate. A dyestuff is obtained which dyes acetate artificial silk red-brown shades.

Example 10

93 parts of aniline are diazotized and coupled with an emulsion of 228 parts of N-hydroxyethyldiphenylamine with an addition of sodium acetate. A dyestuff is obtained which dyes acetate artificial silk red-yellow shades.

Example 11

137 parts of 4-amino-beta-phenylethyl alcohol are diazotized and the diazo compound coupled with an emulsion of 228 parts of N-hydroxyethyldiphenylamine. The resulting dyestuff dyes acetate artificial silk yellow shades.

Example 12

A suspension of the diazo compound of 19.6 parts of 1-amino-2,4,6-trichlorbenzene is run into a well cooled aqueous emulsion of 22.4 parts of N-hydroxyethyl diphenylamine. The resulting yellow dyestuff is readily suitable for coloring stearin or paraffin wax.

The dyestuffs set forth in the following table may be prepared in a manner similar to that described in the foregoing examples.

| Diazo component | Coupling component | Shade of color on acetate artificial silk |
|---|---|---|
| 1-amino-2,6-dichlor-4-nitrobenzene. | N-hydroxyethyl-3-methoxy-diphenylamine. | Brown |
| 1-amino-2,5-dichlor-4-nitrobenzene. | N-hydroxyethyl diphenylamine. | Red |
| 1-hydroxy-2-amino-5-nitrobenzene. | N-hydroxyethyl diphenylamine. | Rose |
| 4-amino-1,1'-azobenzene | N-hydroxydiphenylamine. | Orange |
| 1-amino-4-nitrobenzene | N-hydroxyethyl-4-ethoxy-diphenylamine. | Brown |

What we claim is:

1. A process of producing azo dyestuffs which comprises coupling diphenylamines, capable of being coupled at least once, which are free from sulfonic and carboxylic acid groups and correspond to the general formula:

in which R stands for an aliphatic radical having at least one free hydroxyl group and in which Z stands for a radical of the group consisting of phenyl and such phenyl radicals which bear a substituent selected from the group consisting of alkyl, alkoxy, hydroxyalkyl, amino and alkylamino groups with diazo compounds of aromatic amines free from sulfonic and carboxylic acid groups.

2. Azo dyestuffs corresponding to the general formula:

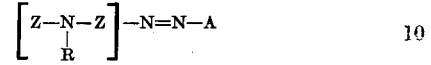

in which R stands for an aliphatic radical having at least one free hydroxyl group, A stands for an aromatic radical and in which Z stands for a radical of the group consisting of phenyl and such phenyl radicals which bear a substituent selected from the group consisting of alkyl, alkoxy, hydroxyalkyl, amino and alkylamino groups.

3. Azo dyestuffs corresponding to the general formula:

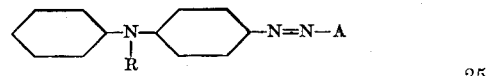

in which A stands for an aromatic radicle and R for an aliphatic radicle having at least one free hydroxyl group.

4. Azo dyestuffs corresponding to the general formula:

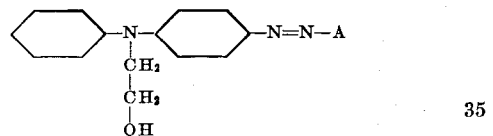

in which A stands for an aromatic radicle.

5. The azo dyestuff having the formula:

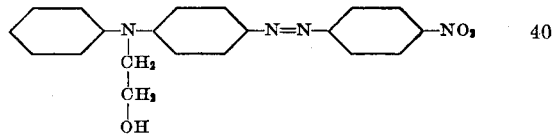

6. The azo dyestuff having the formula:

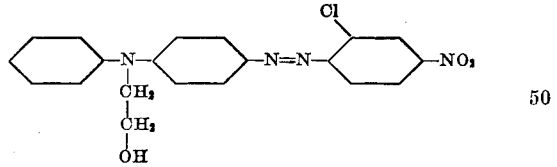

7. The azo dyestuff having the formula:

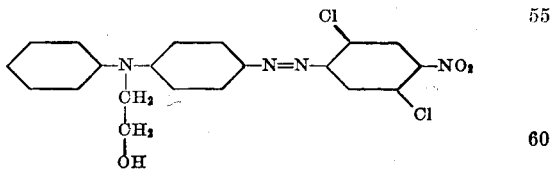

HANS KRZIKALLA.
PAUL GARBSCH.